US012585666B2

(12) United States Patent
Gupta

(10) Patent No.: US 12,585,666 B2
(45) Date of Patent: Mar. 24, 2026

(54) CLOUD ENVIRONMENT DATA DISTRIBUTION

(71) Applicant: SAP SE, Walldorf (DE)

(72) Inventor: Manish Gupta, Bruchsal (DE)

(73) Assignee: SAP SE, Walldorf (DE)

( * ) Notice: Subject to any disclaimer, the term of this patent is extended or adjusted under 35 U.S.C. 154(b) by 157 days.

(21) Appl. No.: 18/070,106

(22) Filed: Nov. 28, 2022

(65) Prior Publication Data

US 2024/0176764 A1 May 30, 2024

(51) Int. Cl.
  *G06F 16/25* (2019.01)
  *G06F 16/182* (2019.01)
  *G06F 16/27* (2019.01)
(52) U.S. Cl.
  CPC .......... *G06F 16/25* (2019.01); *G06F 16/1844* (2019.01); *G06F 16/256* (2019.01); *G06F 16/27* (2019.01)
(58) Field of Classification Search
  None
  See application file for complete search history.

(56) References Cited

U.S. PATENT DOCUMENTS

| 11,941,385 B1* | 3/2024 | Pinski | G06F 8/51 |
| 2013/0290244 A1* | 10/2013 | Nucci | G06F 16/2365 |
| | | | 707/E17.005 |

| 2018/0196832 A1* | 7/2018 | Maybee | H04L 9/14 |
| 2019/0266277 A1* | 8/2019 | Lautenschlaeger | |
| | | | G06F 16/2322 |
| 2021/0311957 A1* | 10/2021 | Georgievski | G06F 9/546 |
| 2022/0405303 A1* | 12/2022 | Pinjala | G06F 16/283 |
| 2023/0153325 A1* | 5/2023 | Ceesay | G06N 20/10 |
| | | | 707/610 |
| 2023/0319106 A1* | 10/2023 | Rozzo | G06F 18/24 |
| | | | 726/22 |
| 2023/0401205 A1* | 12/2023 | Shah | G06F 16/24532 |

* cited by examiner

*Primary Examiner* — Neveen Abel Jalil
*Assistant Examiner* — John J Morris
(74) *Attorney, Agent, or Firm* — SCHWEGMAN LUNDBERG & WOESSNER, P.A.

(57) ABSTRACT

Various examples are directed to systems and methods for managing multiple cloud-delivered services. An integration adapter may receive, from a first cloud-delivered service, event data describing an event at the first cloud-delivered service. The integration adapter may send a request for data objects for responding to the event to a determination engine executing at the data distribution computing system. The determination engine may determine a first data object and a second data object responsive to the request for data objects. The integration adapter may replicate the first data object from a database management system to generate a first replicated data object and replicate the second data object from a second cloud-delivered service to generate a second replicated data object. The integration adapter may send the first replicated data object and the second replicated data object to a target cloud-delivered service.

18 Claims, 8 Drawing Sheets

302 — ACCESS EVENT DATA

304 — DETERMINE DATA OBJECTS RESPONSIVE TO EVENT

306 — REPLICATE DETERMINED DATA OBJECTS FROM SOURCE(S)

308 — SEND REPLICATE A DATA OBJECTS TO TARGET SYSTEM(S)

310 — ACCESS FEEDBACK DATA

400

402 — RECEIVE REQUEST FOR RESPONSIVE DATA OBJECT(S)

404 — APPLY AT LEAST ONE RULE BASED ON EVENT DATA

406 — EXECUTE COMPUTERIZED MODEL WITH INPUT BASED AT LEAST IN PART ON AN EVENT DATA

408 — DETERMINE DATA OBJECT(S) RESPONSIVE TO EVENT BASED ON THE OUTPUT OF AT LEAST ONE RULE AND OUTPUT OF COMPUTERIZED MODEL

500

502 — SEND REQUEST(S)FOR FEEDBACK DATA

504 — RECEIVE FEEDBACK DATA

506 — GENERATE OR MODIFY AT LEAST ONE RULE BASED ON FEEDBACK DATA

508 — GENERATE COMPUTERIZED MODEL TRAINING DATA BASED ON THE FEEDBACK DATA

510 — TRAIN/RE-TRAIN COMPUTERIZED MODEL

CLOUD ENVIRONMENT DATA DISTRIBUTION

BACKGROUND

Traditionally, software has been self-contained and executed on one or more local machines. An enterprise desiring to use a software tool builds an on-premise computing system and executes the software tool on that computing system. The software tool may be developed by the enterprise and/or purchased from a third-party software provider. The user accesses the software tool directly from the computing system or remotely via a networked user computing device.

BRIEF DESCRIPTION OF DRAWINGS

The present disclosure is illustrated by way of example and not limitation in the following figures.

DETAILED DESCRIPTION

Figure 1:
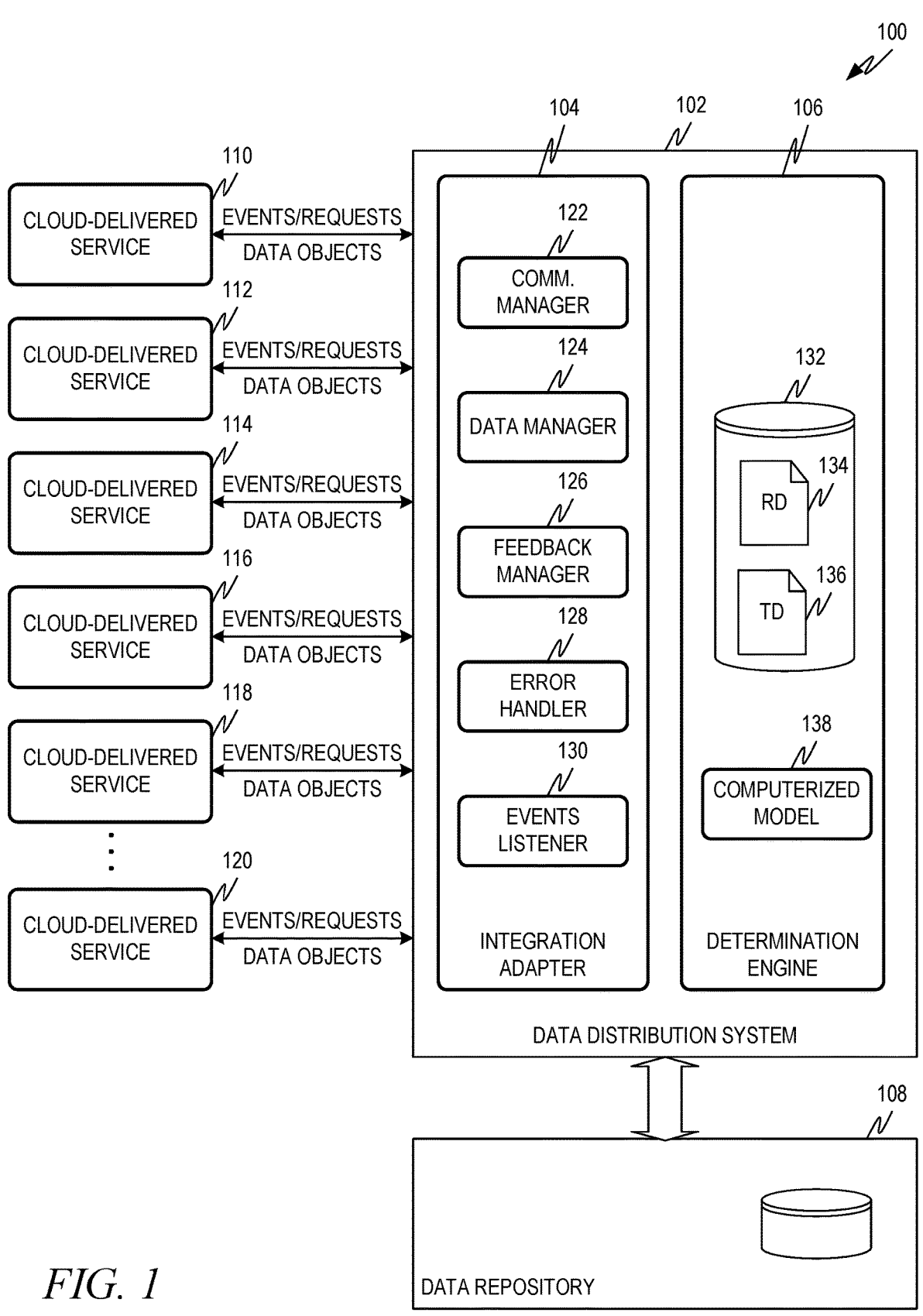
FIG. 1 is a diagram showing one example of an environment comprising a data distribution system and various cloud-delivered services.

When software applications are executed at an on-premise computing system, data can be stored at one or a limited number of data stores, such as database management systems, which may be implemented at the on-premise location. In this way, different software applications executing at the on-premise system may have access to relevant data.

Many software applications, including business software solutions, however, are now provided as cloud-delivered services. In a cloud service delivery arrangement, a software provider, referred to herein as a cloud service provider, delivers software functionality directly to consumer systems via the Internet or another suitable network. Particulars of the provisioning are handled remotely by the cloud service provider. The consumer systems may include user computing devices by which various users consume the cloud-delivered services. The consumer systems may include user computing devices of users associated with a customer of the cloud-delivered service or services.

Cloud-delivered services may manage data in various different ways. For example, a consumer entity may upload data utilized by a cloud-delivered service to a cloud database or other data storage system managed by and/or accessible to the cloud service provider. The cloud-delivered service, then, may access the data while providing the software solution. Consider an example in which the cloud-delivered software service is an accounting solution. The consumer may be an enterprise that purchases the cloud-delivered software service. Users associated with the consumer may be employees or other individuals who access and/or use the accounting solution on behalf of the consumer. Data used for performing accounting tasks may be uploaded to a database or other data source that is accessible to the cloud-delivered service during execution.

Although cloud-delivered services may provide additional flexibility to consumers and their users, they may also raise new challenges. For example, the very flexibility of cloud-delivered services may make it practical for a consumer enterprise to utilize different cloud-delivered services for different software-related tasks, even different cloud-delivered services provided by different cloud service providers. For example, a consumer enterprise may purchase a marketing solution from one cloud service provider, a sales order management system from another cloud service provider, a human resources system from another cloud service provider, and so on.

In mixed environments in which a single consumer enterprise purchases software solutions from multiple cloud service providers, data management may become complicated. For example, the consumer entity may upload data for executing respective cloud-delivered services to databases or other data storage systems associated with each respective cloud service provider. In this way, when a cloud-delivered service needs to access consumer enterprise data, it may do so from a data store associated with the corresponding cloud service provider. Although this arrangement provides cloud-delivered services with access to data, it creates complications for the consumer enterprises. For example, a consumer enterprise wishing to purchase software solutions from multiple cloud service providers may upload and maintain potentially redundant data at multiple cloud service provider data stores. This may create administrative difficulties for the consumer entity and may also create replication difficulties, as the consumer entity may need to maintain accurate data at more than one location.

These and other challenges may be addressed by a data distribution system as described herein. The data distribution system may detect events at a plurality of cloud-delivered services, which may be provided by different cloud service providers. Upon detection of an event at a cloud-delivered service, the data distribution system may determine a set of one or more data objects responsive to the event. The data distribution system may access the set of one or more data objects, from a data repository associated with the data distribution system and/or from one or more other cloud-delivered services. Upon accessing the set of one or more data objects, the data distribution system may replicate the set of one or more data objects and provide the replicated data objects to one or more target cloud-delivered services. In some examples the target cloud-delivered service may be or include the cloud-delivered service generating the event, or may be or include one or more different cloud-delivered services.

The data distribution system may provide data objects to cloud-delivered services as-needed by the cloud-delivered services. In some examples, the data distribution system may reduce or eliminate the need for consumer entities to maintain duplicate and/or replicated data at multiple different cloud service providers.

FIG. 1 is a diagram showing one example of an environment 100 comprising a data distribution system 102 and various cloud-delivered services 110, 112, 114, 116, 118, 120. The data distribution system 102 may be implemented in any suitable manner such as, for example, in a cloud environment, and an on-premise computing system, and/or the like. The data distribution system 102 may be in communication with a data repository 108. The data repository 108 may be any suitable data storage system or device. In some examples, the data repository 108 may include a database management system such as, for example, the HANA® and S/4 HANA® systems available from SAP SE of Walldorf, Germany.

The data distribution system 102 may comprise an integration adapter 104 and a determination engine 106. The integration adapter 104 may be configured to communicate with cloud-delivered services 110, 112, 114, 116, 118, 120 and/or with the data repository 108. The determination engine 106 may be configured to determine one or more data objects to be provided to one or more of the cloud-delivered services in response to one or more events, as described herein.

The integration adapter 104 may comprise one or more executable software components. The integration adapter 104 may execute at the data distribution system 102. In some examples, the data distribution system 102 may be implemented utilizing an on-premise computing system. The integration adapter 104 may be comprised of one or more executable files that execute at the on-premise computing system. Also, in some examples the data distribution system 102 is implemented in a cloud environment. When the data distribution system 102 is implemented in a cloud environment, the integration adapter 104 may be implemented as one or more executable software components executing in a container, virtual machine, or in another suitable arrangement at the cloud environment.

In some examples, the integration adapter 104 includes various subsystems including, for example, a communication manager 122, a data manager 124, a feedback manager 126, an error handler 128, and an events listener 130. The subsystems of the integration adapter 104 may be implemented in various different ways. In some examples, the subsystems of the integration adapter 104 may be implemented as respective functions associated with a single executable. In other examples, the subsystems of the integration adapter 104 may be implemented as separate executables associated with a main executable of the integration adapter 104. In some examples, the subsystems of the integration adapter 104 may be implemented according to a microservice arrangement, where each subsystem is comprised of one or more microservices, which may be executed at respective containers in, for example, a cloud environment.

The events listener 130 may be configured to detect events generated by the cloud-delivered services 110, 112, 114, 116, 118, 120, as described herein. In some examples, the events listener 130 may also prompt processing of an event when said event is detected. The error handler 128 may be configured to determine errors in the operation of the integration adapter 104 and or determination engine 106 and may be configured to log detected errors for future troubleshooting. The feedback manager 126 may, as described herein, receive and/or solicit feedback from one or more of the cloud-delivered services 110, 112, 114, 116, 118, 120. In some examples, the feedback manager 126 may also utilize received feedback data to generate training data used to train a computerized model 138 of the determination engine 106 and/or to generate rule data describing one or more rules for processing events.

The data manager 124 may be configured to read data objects from other systems, such as from other cloud-delivered services 110, 112, 114, 116, 118, 120, from the data repository 108, and/or the like. The data manager 124 may also be configured to perform various processing on data objects, for example, to replicate the data objects in a form processable by a target cloud-delivered service.

The communications manager 122 may be configured to communicate with various cloud-delivered services 110, 112, 114, 116, 118, 120. For example, the communications manager 122 may be configured to interface with Application Programming Interfaces (APIs) arranged to use various different protocols and/or architectures such as, for example, Simple Object Access Protocol (SOAP), a REpresentational State Transfer (REST) architecture (e.g., using HyperText Transfer Protocol (HTTP)), Open Data Protocol (OData), and/or the like.

Similar to the integration adapter 104, the determination engine 106 may comprise one or more executable software components. For example, if the data distribution system 102 is implemented utilizing an on-premise computing system, the determination engine 106 may comprise one or more executable files that execute at the on-premise computing system. In examples where the data distribution system 102 is implemented in a cloud environment, the determination engine 106 may be implemented using one or more executable software components that execute inside a container, virtual machine, or another suitable arrangement at the cloud environment.

The determination engine 106 may have an associated persistence 132 for storing data utilized by the determination engine 106 during its execution. The persistence 132 may be implemented at the data distribution system 102. In some examples, the persistence 132 may be implemented at the data repository 108 and/or at another suitable location accessible to the determination engine 106 during execution. In various examples, the integration adapter 104 may also utilize a persistence (not shown in FIG. 1).

The persistence 132 of the determination engine 106 may comprise rule data 134 and training data 136. The rule data 134 may describe one or more rules that may be applied by the determination engine 106, for example, in response to an event detected by the integration adapter 104 (e.g., the events listener 130 thereof). A rule described by rule data 134 may indicate one or more data objects and corresponding target services that correspond to an event. A target service for a data object is a cloud-delivered service 110, 112, 114, 116, 118, 120 that is to receive that data object in response to the event. The training data 136 may be used to train a computerized model 138. The training data 136 may be generated, in some examples, by the integration adapter 104 (e.g., the feedback manager 126 thereof).

The computerized model 138 may be a trained machine learning model that is configured to receive inputs describing an event from one or more of the cloud-delivered services 110, 112, 114, 116, 118, 120. In response to the inputs describing an event, the computerized model 138 may generate an output describing one or more data objects to be provided to one or more of the cloud-delivered services 110, 112, 114, 116, 118, 120 in response to the event. The computerized model 138 may be of any suitable form including, for example, a classification model, such as a logistic regression model, a naive Bayes model, a K-nearest neighbors model, a decision tree model, a random forest model, a support vector machine (SVM) model, and so on. The computerized model 138 may be implemented in various different ways. In some examples, the computerized model 138 is implemented as a function that is callable by the determination engine 106. Also, in some examples, the computerized model 138 is implemented as an executable separate from a main executable of the determination engine 106. In some examples, the computerized model 138 is implemented according to a micro-service arrangement, where the computerized model 138 is executed in a container associated with the determination engine 106 such that it can be called by other components of the determination engine 106.

The cloud-delivered services 110, 112, 114, 116, 118, 120 may provide various software solutions to users (not shown in FIG. 1). Examples of software solutions that may be provided by the various cloud-delivered services 110, 112, 114, 116, 118, 120 include sales management system, a consumer resource management (CRM) system, a payroll system, a human resources management system, and/or the like.

The cloud-delivered services 110, 112, 114, 116, 118, 120 may be provided by a single cloud service provider and/or, in some examples, different cloud-delivered services 110, 112, 114, 116, 118, 120 may be provided by different cloud service providers. In some examples, the cloud-delivered services 110, 112, 114, 116, 118, 120 may be provided according to any suitable cloud model such as, for example, Software as a Service (Saas). According to SaaS, the cloud service provider generates an, often scalable, software application that is provided to the consumer systems via the Internet or another suitable network. The SaaS cloud service provider system manages infrastructure, platform, application, and data management, either directly or via another Platform as a Service (PaaS) and/or Infrastructure as a Service (IaaS) cloud service provider.

In various examples, cloud-delivered services 110, 112, 114, 116, 118, 120 are provided using an environment structure. In an environment structure, the cloud service provider maintains one or more environments. The environments may be or include one or more data centers including one or more virtual and/or hardware services. The cloud-delivered service executes at the environments. Consumer systems, such as users associated with various enterprise consumers, access the cloud service by accessing the environments.

The various cloud-delivered services 110, 112, 114, 116, 118, 120 are configured to generate events. An event may be generated, for example, upon the occurrence of one or more conditions at the respective cloud-delivered services 110, 112, 114, 116, 118, 120. Consider an example cloud-delivered service that is a human resources management software solution. Example events generated by such a cloud-delivered service may include, onboarding of a new employee, a retirement of an employee, payroll, and/or the like. Other cloud-delivered services 112, 114, 116, 118, 120 performing different tasks may have different events. Consider an example cloud-delivered service that is a consumer resource management (CRM) system. Example events generated by such a cloud-delivered service may include: a purchase of a good or service by a consumer, a meeting, phone call, or other contact with a consumer, and/or the like.

The integration adapter 104 (e.g., the events listener 130 thereof) may detect an event generated by one of the cloud-delivered services 110, 112, 114, 116, 118, 120. Upon detecting an event, the integration adapter 104 may send a request for data objects to the determination engine 106. The request may include a description of the event. The determination engine 106, upon receiving the request for data objects, may determine one or more data objects responsive to the event. The determination engine 106 may also determine, for each data object, one or more target cloud-delivered services 110, 112, 114, 116, 118, 120. A target cloud-delivered service for a data object is a cloud-delivered service 110, 112, 114, 116, 118, 120 to which the data object is to be delivered in response to the event. The determination engine 106 may provide indications of the one or more data objects and corresponding target cloud-delivered services to the integration adapter 104 (e.g., the data manager 124 thereof).

The integration adapter 104 may retrieve the indicated data objects and replicate the data objects to the respective target cloud-delivered services. The data objects may be retrieved from the data repository 108 and/or from one or more source cloud-delivered services 110, 112, 114, 116, 118, 120. Replicating the data objects may include performing various processing on the data objects such as, for example, applying one or more transformation rules to one or more of the data objects, consolidating multiple data objects into a single data object and/or data object package to be provided to a single cloud-delivered service, and/or the like. Upon replicating the data objects, the integration adapter 104 (e.g., the data manager 124 thereof) may send the replicated data objects to respective one or more target cloud-delivered services.

In some examples, after responding to an event, the integration adapter 104 (e.g., the feedback manager 126 thereof) may solicit feedback data from the one or more target cloud-delivered services 110, 112, 114, 116, 118, 120. For example, the integration adapter 104 may send a feedback request message to a target cloud-delivered service. The feedback request message may include data describing one or more data objects provided to the target cloud-delivered service and, in some examples, also includes an indication of the event that prompted the data distribution system 102 to provide the data objects to the target cloud-delivered service. Responsive to the feedback request message, the target cloud-delivered service may provide the integration adapter 104 with feedback data describing the responsiveness of the one or more data objects provided to the target cloud-delivered service.

The integration adapter 104 (e.g., the feedback manager 126 thereof) may utilize the feedback data to generate training data 136 for the computerized model 138, which may be provided to the determination engine 106 for storage at the persistence 132. In some examples, the integration adapter 104 may utilize newly-generated training data 136 to re-train the computerized model 138. This may improve the accuracy of the computerized model 138 in predicting data objects used by the various target cloud-delivered services 110, 112, 114, 116, 118, 120. Also, in some examples, the integration adapter (e.g., the feedback manager 126 thereof) may utilize the feedback data to generate and/or modify rule data 134. New and/or modified rule data 134 may be stored at the persistence 132 of the determination engine 106, for example, for use as described herein.

Figure 2:
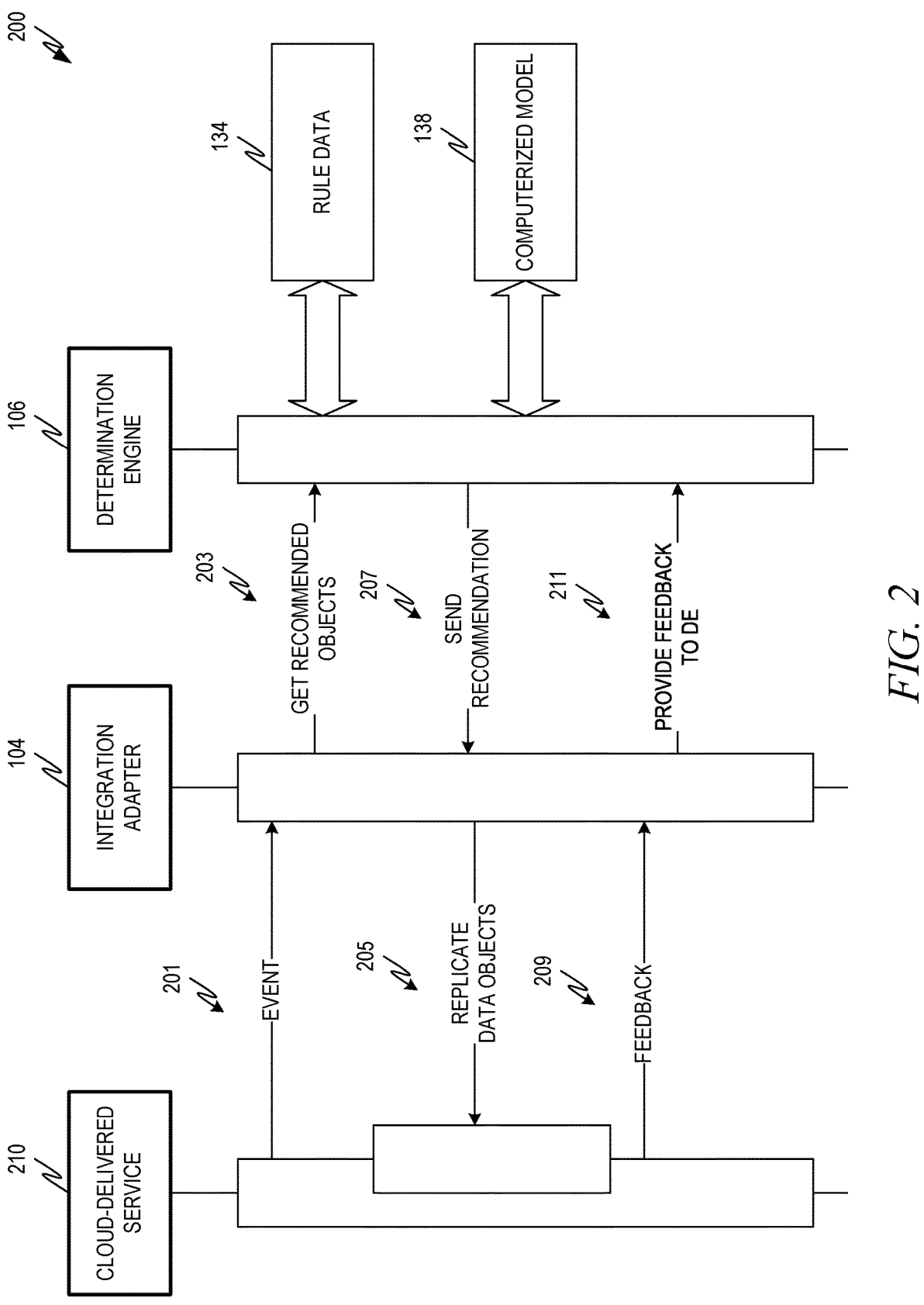
FIG. 2 is a swim lane diagram showing one example of a process flow that may be executed in the environment of FIG. 1 to provide at least one data object to a cloud-delivered service in response to an event.

FIG. 2 is a swim lane diagram showing one example of a process flow 200 that may be executed in the environment 100 of FIG. 1 to provide at least one data object to a cloud-delivered service 210 in response to an event. In the example of FIG. 2, the integration adapter 104 and determination engine 106 are shown. FIG. 2 also includes a cloud-delivered service 210. The cloud-delivered service 210 may be similar to the cloud-delivered services 110, 112, 114, 116, 118, 120 of FIG. 1.

The cloud-delivered service 210 may generate event data 201. The event data 201 may be provided to the integration adapter 104. Event data 201 may describe any event during the processing of the cloud-delivered service 210. Consider an example in which the cloud-delivered service 210 provides a human resources management service. An example event may be an onboarding event for an employee. In this example, the event data 201 may include an indication of the event and/or data describing the employee to be onboarded. Consider another example in which the cloud-delivered service 210 provides an information technology (IT) management service. An example event may be a service ticket received from a user. The event data 201 may include an indication of the service ticket and data describing the service ticket such as, for example, a description of the problem that prompted the service ticket.

The integration adapter 104 may receive the event data 201 and send a request for data objects 203 to the determination engine 106. The request for data objects 203 may include a description of the event that may include some or all of the event data 201. The determination engine 106 may receive the request for data objects 203. In response, the determination engine 106 may determine one or more data objects to be provided to the cloud-delivered service 210 and/or to one or more other cloud-delivered services.

The determination engine 106 may select the data objects responsive to the event using the rule data 134 and/or the computerized model 138. For example, the rule data 134 may include descriptions of one or more business processes associated with the event. For example, the rule data 134 may describe data objects that are responsive to various events. The determination engine 106 may examine the rule data 134 and access descriptions of one or more data objects that are responsive to the event described by the event data 201. The rule data 134, in some examples, may also describe a source for each data object. The source may be, for example, a data repository such as the data repository 108, and/or a cloud-delivered service such as one of the cloud-delivered services 110, 112, 114, 116, 118, 120.

In addition to or instead of using the rule data 134, the determination engine 106 may utilize the computerized model 138 to determine one or more data objects that are responsive to the event described by the event data 201. For example, the determination engine 106 may provide all or part of the description of the event included with the request for data objects 203 as input to the computerized model 138. As output, the computerized model 138 may generate an indication of one or more data objects responsive to the event. In some examples, the computerized model 138 may also provide an indication of a source for some or all of the determined data objects.

The determination engine 106, as described, may use the rule data 134, the computerized model 138, or both. In examples where the determination engine 106 uses both the rule data 134 and the computerized model 138, the determination engine 106 may receive an indication of data objects returned by use of the rule data 134 and an indication of data objects returned by the computerized model 138. The determination engine 106 may return to the integration adapter 104 all non-duplicate data objects returned by the rule data 134 or the computerized model 138. Also, in some examples, the determination engine 106 may return only data objects that are indicated by both the rule data 134 and the computerized model 138.

Upon determining one or more data objects that are responsive to the event, the determination engine 106 may send recommendation data 207 to the integration adapter 104. The recommendation data 207 may include a description of each of the one or more data objects responsive to the event. In some examples, the recommendation data 204 also indicates a source for one or more of the data objects.

The integration adapter 104 may replicate the response of data objects indicated by the recommendation data 207 to the cloud-delivered service 210. The replication may be handled, in some examples, by the data manager 124. This may include retrieving the responsive data objects from their respective sources. The retrieving may be handled, in some examples, by the communications manager 122. Replicating the responsive data objects may also include performing one or more transformations on the data objects to generate replicated data objects. For example, a cloud-delivered service might need an aggregated data set in a format that is suitable for an internal database structure of the cloud-delivered service. Replicating responsive data objects for such a cloud-delivered service may include modifying the data objects to place them in the suitable format. The replicated data objects, for example, may be in a format that is compatible with the target cloud-delivered service 210.

The integration adapter 104 provides replicated data objects 205 to the cloud-delivered service 210, which may use the replicated data objects 205 in its own processing. The example of FIG. 2 shows the replicated data objects 205 being provided to a single cloud-delivered service 210, which was also the service that generated the event. In some examples, however, one or more of the response of data objects may be delivered to a different target cloud-delivered service, such as, for example 1 of the cloud-delivered services 110, 112, 114, 116, 118, 120. In these examples, the generating of the replicated data object may include transforming the data object according to a format that is usable by its target cloud-delivered service.

The cloud-delivered service 210 may provide feedback data 209 to the integration adapter 104. The cloud-delivered service 210 may provide the feedback data 209 spontaneously or, in some examples, the integration adapter 104 may query the cloud-delivered service 210 for the feedback data 209. The feedback data 209 may describe a responsiveness of the replicated data objects 205 provided to the cloud-delivered service 210. For example, the feedback data 209 may include an indication of whether the replicated data objects 205 were responsive to the event. The indication may be qualitative and/or quantitative. For example, a qualitative indication of whether a provided replicated data object 205 was responsive to the event may include an indication that the replicated data object 205 was responsive to the event or was not responsive to the event. A quantitative indication of whether a provided replicated data object 205 was responsive to the event may include a responsiveness rating or score indicating how responsive the data object was to the event. In some examples, the feedback data 209 may also indicate one or more data objects that were responsive to the event but were not provided as replicated data objects 205.

The integration adapter 104 may utilize the feedback data 209 to generate and provide feedback data 211 to the determination engine 106. The feedback data 211 provided to the determination engine 106 may include, for example, rule data 134 and/or updates to rule data 134, and/or training data 136 or updates to training data 136. In some examples, the integration adapter 104 may prompt a re-training of the computerized model 138 using new or updated training data

136 based on the feedback data 209. The retraining of the computerized model 138 may occur periodically and/or may occur upon receipt of a threshold level of feedback data 211.

Figure 3:
FIG. 3 is a flowchart showing one example of a process flow that may be executed in the environment of FIG. 1 to distribute data objects to one or more cloud-delivered services.
Figure 3:
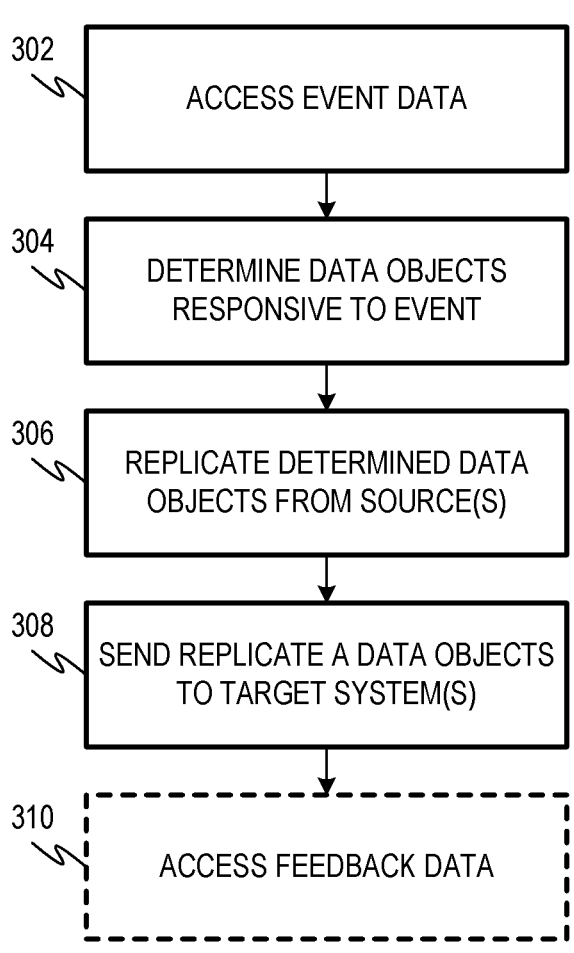

FIG. 3 is a flowchart showing one example of a process flow 300 that may be executed in the environment 100 to distribute data objects to one or more cloud-delivered services. At operation 302, the data distribution system 102 (e.g., the integration adapter 104) may access event data. As described herein, the event data may be received from a cloud-delivered service 110, 112, 114, 116, 118, 120. The cloud-delivered service may send the event data to the data distribution system 102. In some examples, the data distribution system 102 may query the various cloud-delivered services 110, 112, 114, 116, 118, 120 to receive event data when an event has occurred at the respective cloud-delivered service.

At operation 304, the data distribution system 102 may determine one or more data objects that are responsive to the event described by the event data accessed at operation 304. For example, the determination engine 106 of the data distribution system 102 may identify the one or more responsive data objects as described herein. The determination engine 106 may, for example, utilize the computerized model 138 and/or rule data 134 to select one or more responsive data objects. In some examples, the determination engine 106 may also identify, for each data object, a source and a target cloud-delivered service. The source for a data object may be a location where the data object is stored. This may be a data repository, such as the data repository 108, and/or a cloud-delivered service, such as one of the cloud-delivered services 110, 112, 114, 116, 118, 120. The target cloud-delivered service for a data object is the cloud-delivered service 110, 112, 114, 116, 118, 120 to which the data object will be delivered in response to the event. The target cloud-delivered service for a data object may be the cloud-delivered service that generated the event or another cloud-delivered service.

At operation 306, the data distribution system 102 (e.g., the integration adapter 104) may replicate the responsive data objects from their various sources to generate a set of replicated data objects. Replicating a data object may include accessing the data object from its source and performing one or more transformations on the data object, for example, to transform the data object to a format that is consumable by the target cloud-delivered service. At operation 308, the data distribution system 102 (e.g., the integration adapter 104) may send the replicated data objects to their respective target system or systems. At optional operation 310, the data distribution system 102 may access feedback data describing the responsiveness of the replicated data items to the event. The feedback data may be used, for example, by the feedback manager 126 of the integration adapter 104, to generate and/or update rule data 134 and/or to generate and/or update training data 136, as described herein. In some examples, the computerized model 138 may be retrained based on the feedback data.

Figure 4:
FIG. 4 is a flowchart showing one example of a process flow that may be executed in the environment of FIG. 1 to select one or more data objects for distribution in response to an event.
Figure 4:
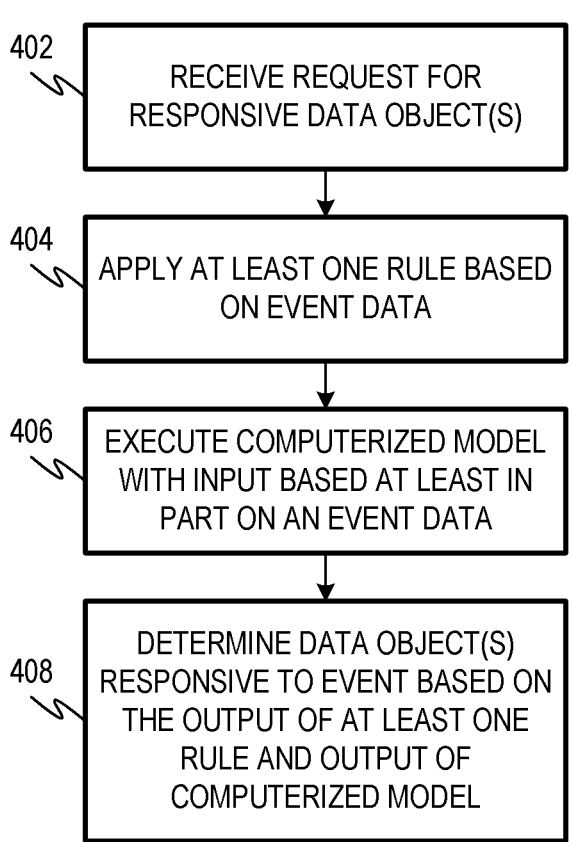

FIG. 4 is a flowchart showing one example of a process flow 400 that may be executed in the environment 100 to select one or more data objects for distribution in response to an event. The process flow 400 shows one example way that the data distribution system 102 (e.g., the determination engine 106 thereof) may execute operation 304 of the process flow 300.

At operation 402, the data distribution system 102 (e.g., the integration adapter 104 and/or determination engine 106) may access event data. The event data may have been received from one or more of the cloud-delivered services

110, 112, 114, 116, 118, 120 and may be indicative of an event in the processing of that cloud-delivered service. At operation 404, the data distribution system 102 (e.g., the determination engine 106) may apply at least one rule from the rule data 134 based on the event data accessed at operation 402. The rule may describe one or more data objects that are responsive to the event indicated by the event data.

At operation 406, the data distribution system 102 (e.g., the determination engine 106) may execute the computerized model 138 with input based at least in part on the event data accessed at operation 402. The result of computerized model 138 may include indications of one or more data objects responsive to the event described by the event data.

At operation 408, the data distribution system 102 (e.g., the determination engine 106) may determine one or more data objects that are responsive to the event described by the event data accessed at operation 402. This may be determined based on the output of the at least one rule applied at operation 404 and/or the computerized model applied at operation 406. In some examples, the responsive data objects may include all data objects that are indicated by the application of the at least one rule and/or returned by the computerized model 138.

Figure 5:
FIG. 5 is a flowchart showing one example of a process flow that may be executed to manage feedback data.
Figure 5:
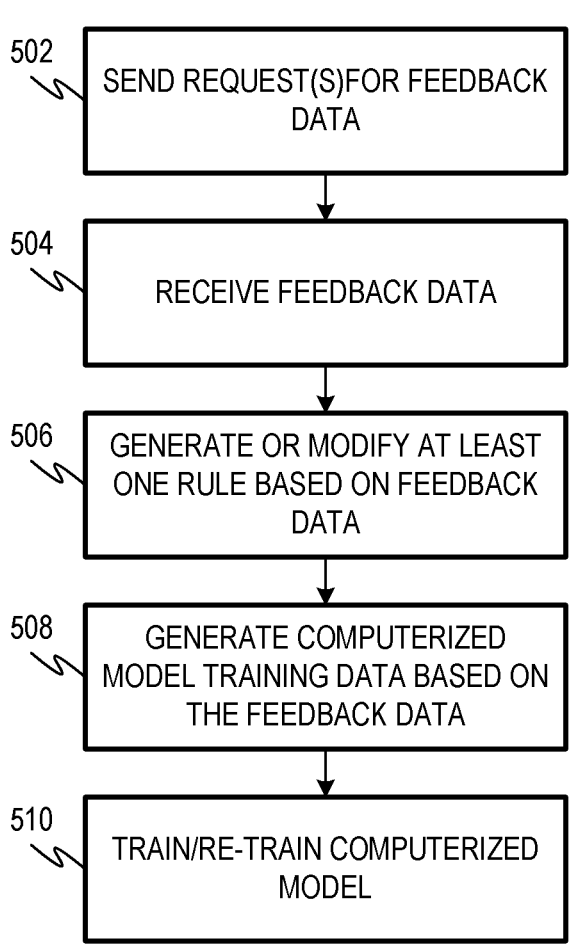

FIG. 5 is a flowchart showing one example of a process flow 500 that may be executed, for example, by the feedback manager 126 of the integration adapter 104 to manage feedback data. At operation 502, the feedback manager 126 may send one or more requests for feedback data. In some examples, the feedback manager 126 may send a request for feedback data to each cloud-delivered service 110, 112, 114, 116, 118, 120 that has received at least one data object responsive to an event at one of the cloud-delivered services 110, 112, 114, 116, 118, 120.

At operation 504, the feedback manager 126 may receive feedback data from the one or more cloud-delivered services 110, 112, 114, 116, 118, 120. For example, the query to the cloud-delivered service or services may respond to the request or requests for feedback sent at operation 502. It will be appreciated that, in some examples, some or all of the cloud-delivered services 110, 112, 114, 116, 118, 120 may be configured to automatically send feedback data to the data distribution system upon receiving one or more data objects responsive to an event. In these examples, the feedback manager 126 may not send a request for feedback data if feedback it has already been received, or is expected to be received without sending a request.

At operation 506, the feedback manager 126 may generate or modify at least one rule described by the rule data 134. Consider an example in which the feedback data indicates that one or more of the cloud-delivered services wanted an additional responsive data object (e.g., a data object that was not originally provided by the data distribution system 102). In this example, the feedback manager 126 may modify a rule described by the rule data 134 to indicate that the additional responsive data object should be provided to the one or more of the cloud-delivered services. Consider another example in which the feedback data from one or more of the cloud-delivered services indicates that a data object provided to the cloud-delivered service in response to an event was not responsive to the event and/or otherwise not needed by the cloud-delivered service. In this example, the feedback manager 126 may modify the rule data 134 to remove a reference to the nonresponsive data object.

At operation 508, the feedback manager 126 may generate computerized model training data based on the feedback data. For example, the feedback data may include qualitative and/or quantitative indications of the responsiveness of data objects provided to one or more of the cloud-delivered services in response to an event. The feedback manager 126 may utilize event data describing the relevant event and label the event data based on the feedback data. For example, labels to the event data may indicate data objects that are responsive to the event data and corresponding target cloud-delivered services. The labeled data may be used as training data to train the computerized model 138. At operation 510, the feedback manager 126 may (optionally) train or re-train the computerized model 138 based on updated training data 136 generated at operation 508.

Figure 6:
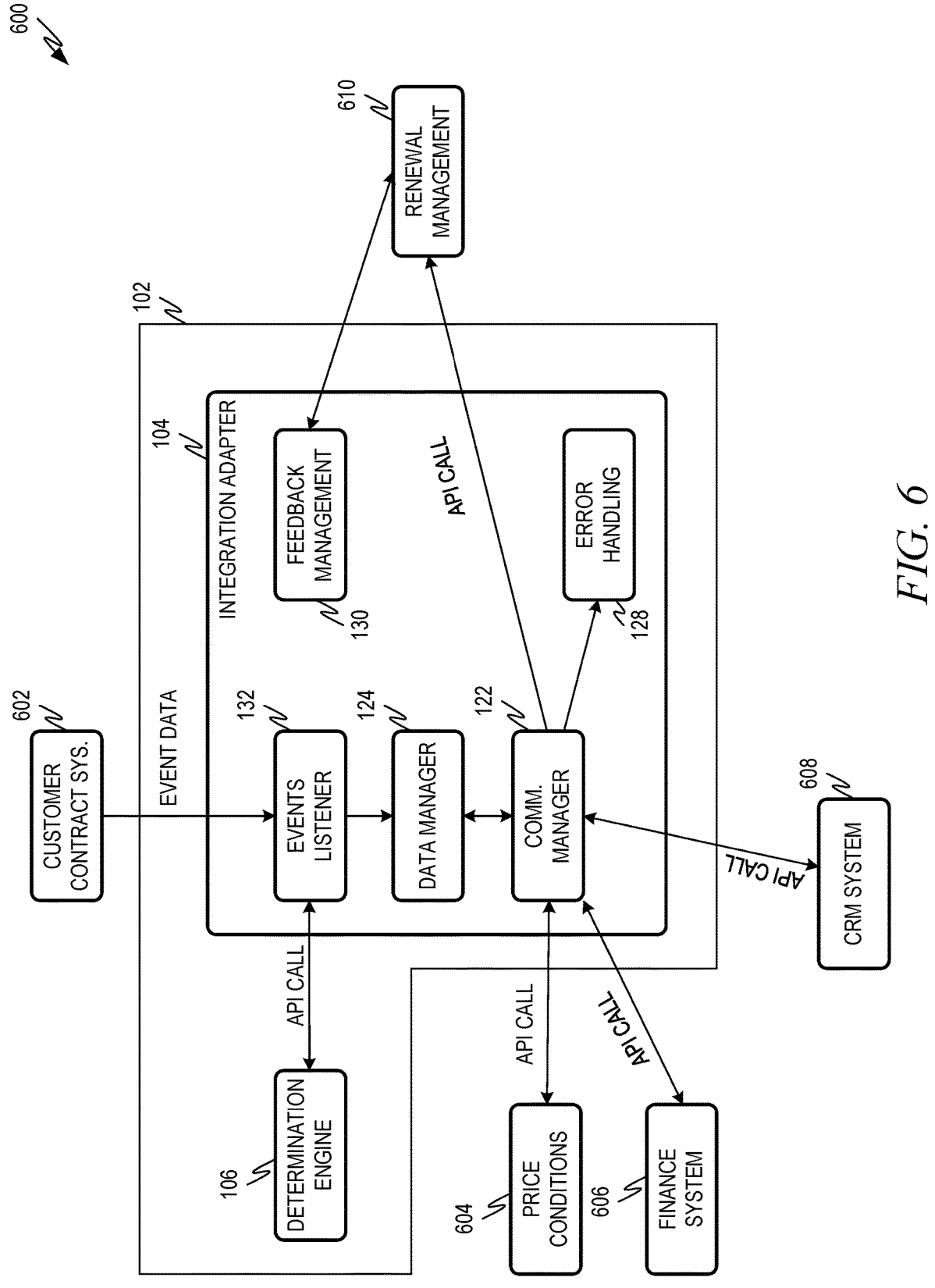
FIG. 6 is a diagram showing an example including the data distribution system from the environment of FIG. 1 in communication with various cloud-delivered services.

FIG. 6 is a diagram showing an example 600 including the data distribution system 102 from the environment 100 in communication with various cloud-delivered services 602, 604, 606, 608, 610. In the example of FIG. 6, the cloud-delivered services include a customer contract service 602, a price conditions service 604, a finance service 606, a CRM service 608, and a renewal management service 610. The customer contract service 602 may be arranged to manage and/or generate various contracts for customers of the consumer enterprise. The price conditions service 604 may be configured to determine a price for a product or service sold by the consumer enterprise. For example, price conditions service 604 may apply relevant discounts depending on circumstances. The finance service 606 may handle accounting matters related to customer contracts and/or sales. The CRM service 608 may manage contacts associated with various customers of the consumer enterprise. The renewal management service 610 may manage expiring contracts for the consumer enterprise.

In the example of FIG. 6, the customer contract service 602 may determine that a customer of the consumer enterprise has a contract that is eligible for renewal. In response, the customer contract service 602 may send event data to the integration adapter 104 (e.g., the events listener 130). The event data may indicate the contract renewal start event.

The event data may be received by the events listener 130. The events listener 130 may send a request for data objects to the determination engine 106, for example, via an API call. The determination engine 106, as described herein, may provide an indication of data objects responsive to the contract renewal event indicated by the event data. In this example, the determination engine 106 may determine the following responsive data objects: a price condition data object describing current prices for a product or service purchased by the customer, a previous discount data object describing previous discounts provided to the customer, a customer payment behavior data object describing previous payment behaviors of the customer, a parallel deal data object describing similar contracts between the consumer enterprise and other customers, and an important decision makers data object describing individuals associated with customers who are empowered to make decisions regarding the contract renewal.

The events listener 130 may provide the indication of the responsive data objects to the data manager 124. The data manager 124 may prompt the communications manager 122 to communicate with various cloud-delivered services 604, 606, 608 to retrieve the responsive data objects. For example, the price condition data object, the previous discount data object, and the parallel deal data object may be retrieved from the price conditions service 604. The customer payment behavior data object may be retrieved from the finance service 606. The important decision makers data object may be retrieved from the CRM service 608.

The communications manager 122 may receive the responsive data objects from the respective cloud-delivered services 604, 606, 608 and provide them to the data manager 124. The data manager 124 may replicate the responsive data objects to generate replicated data objects, as described herein. The replicated data objects may be provided to the communication manager 122, which may send them to a target system, which in this example is the renewal management service 610.

After the replicated data objects are provided to the target system, in this example the renewal management service 610, the feedback manager 126 may send a feedback request message to the renewal management service 610. The renewal management service 610 may provide feedback data describing the responsiveness of the provided data objects to the event triggered by the customer contract service 602. The feedback manager 126 may utilize the received feedback data as described herein.

EXAMPLES

Example 1 is a system for managing multiple cloud-delivered services, the system comprising: at least one processor programmed to perform operations comprising: receiving, by an integration adapter executing at a data distribution computing system, event data from a first cloud-delivered service, the event data describing an event at the first cloud-delivered service; sending, by the integration adapter and to a determination engine executing at the data distribution computing system, a request for data objects for responding to the event; determining, by the determination engine, a first data object and a second data object responsive to the request for data objects, the first data object being stored by at a database management system in communication with the data distribution computing system, and the second data object being stored by a second cloud-delivered service; replicating, by the integration adapter, the first data object from the database management system to generate a first replicated data object; replicating, by the integration adapter, the second data object from the second cloud-delivered service to generate a second replicated data object; and sending, by the integration adapter, the first replicated data object and the second replicated data object to a target cloud-delivered service.

In Example 2, the subject matter of Example 1 optionally includes the operations further comprising: executing, by the determination engine, a trained computerized model; providing, by the determination engine, to the trained computerized model, at least a portion of the event data; and generating, by the trained computerized model, a description of the first data object and a description of the second data object.

In Example 3, the subject matter of Example 2 optionally includes the operations further comprising: sending, by the integration adapter and to the first cloud-delivered service, a feedback request message; and receiving, by the integration adapter and from the first cloud-delivered service, feedback data, the feedback data describing a responsiveness of the first data object or the second data object to the event.

In Example 4, the subject matter of Example 3 optionally includes the operations further comprising: generating, by the integration adapter, training data for training the trained computerized model, the training data being based at least in part on the feedback data.

In Example 5, the subject matter of Example 4 optionally includes the operations further comprising re-training the trained computerized model using the training data.

In Example 6, the subject matter of any one or more of Examples 3-5 optionally includes the determining of at least one of the first data object or the second data object being based at least in part on rule data describing data objects responsive to the event, the operations further comprising generating, by the integration adapter, updated rule data based at least in part on the feedback data.

In Example 7, the subject matter of any one or more of Examples 3-6 optionally includes the feedback data describing a third data item responsive to the event.

In Example 8, the subject matter of any one or more of Examples 1-7 optionally includes the determining of at least one of the first data object or the second data object being based at least in part on rule data describing data objects responsive to the event and at least in part on an output of a trained computerized model.

Example 9 is a method for managing multiple cloud-delivered services, the method comprising: receiving, by an integration adapter executing at a data distribution computing system, event data from a first cloud-delivered service, the event data describing an event at the first cloud-delivered service; sending, by the integration adapter and to a determination engine executing at the data distribution computing system, a request for data objects for responding to the event; determining, by the determination engine, a first data object and a second data object responsive to the request for data objects, the first data object being stored by at a database management system in communication with the data distribution computing system, and the second data object being stored by a second cloud-delivered service; replicating, by the integration adapter, the first data object from the database management system to generate a first replicated data object; replicating, by the integration adapter, the second data object from the second cloud-delivered service to generate a second replicated data object; and sending, by the integration adapter, the first replicated data object and the second replicated data object to a target cloud-delivered service.

In Example 10, the subject matter of Example 9 optionally includes executing, by the determination engine, a trained computerized model; providing, by the determination engine, to the trained computerized model, at least a portion of the event data; and generating, by the trained computerized model, a description of the first data object and a description of the second data object.

In Example 11, the subject matter of Example 10 optionally includes sending, by the integration adapter and to the first cloud-delivered service, a feedback request message; and receiving, by the integration adapter and from the first cloud-delivered service, feedback data, the feedback data describing a responsiveness of the first data object or the second data object to the event.

In Example 12, the subject matter of Example 11 optionally includes generating, by the integration adapter, training data for training the trained computerized model, the training data being based at least in part on the feedback data.

In Example 13, the subject matter of Example 12 optionally includes re-training the trained computerized model using the training data.

In Example 14, the subject matter of any one or more of Examples 11-13 optionally includes the determining of at least one of the first data object or the second data object being based at least in part on rule data describing data objects responsive to the event, the method further comprising generating, by the integration adapter, updated rule data based at least in part on the feedback data.

In Example 15, the subject matter of any one or more of Examples 11-14 optionally includes the feedback data describing a third data item responsive to the event.

In Example 16, the subject matter of Example 15 optionally includes the determining of at least one of the first data object or the second data object being based at least in part on rule data describing data objects responsive to the event and at least in part on an output of the trained computerized model.

Example 17 is a non-transitory machine-readable medium comprising instructions thereon that, when executed by at least one processor, causes the at least one processor to perform operations comprising: receiving, by an integration adapter executing at a data distribution computing system, event data from a first cloud-delivered service, the event data describing an event at the first cloud-delivered service; sending, by the integration adapter and to a determination engine executing at the data distribution computing system, a request for data objects for responding to the event; determining, by the determination engine, a first data object and a second data object responsive to the request for data objects, the first data object being stored by a database management system in communication with the data distribution computing system, and the second data object being stored by a second cloud-delivered service; replicating, by the integration adapter, the first data object from the database management system to generate a first replicated data object; replicating, by the integration adapter, the second data object from the second cloud-delivered service to generate a second replicated data object; and sending, by the integration adapter, the first replicated data object and the second replicated data object to a target cloud-delivered service.

In Example 18, the subject matter of Example 17 optionally includes the operations further comprising: executing, by the determination engine, a trained computerized model; providing, by the determination engine, to the trained computerized model, at least a portion of the event data; and generating, by the trained computerized model, a description of the first data object and a description of the second data object.

In Example 19, the subject matter of Example 18 optionally includes the operations further comprising: sending, by the integration adapter and to the first cloud-delivered service, a feedback request message; and receiving, by the integration adapter and from the first cloud-delivered service, feedback data, the feedback data describing a responsiveness of the first data object or the second data object to the event.

In Example 20, the subject matter of Example 19 optionally includes the operations further comprising: generating, by the integration adapter, training data for training the trained computerized model, the training data being based at least in part on the feedback data.

Figure 7:
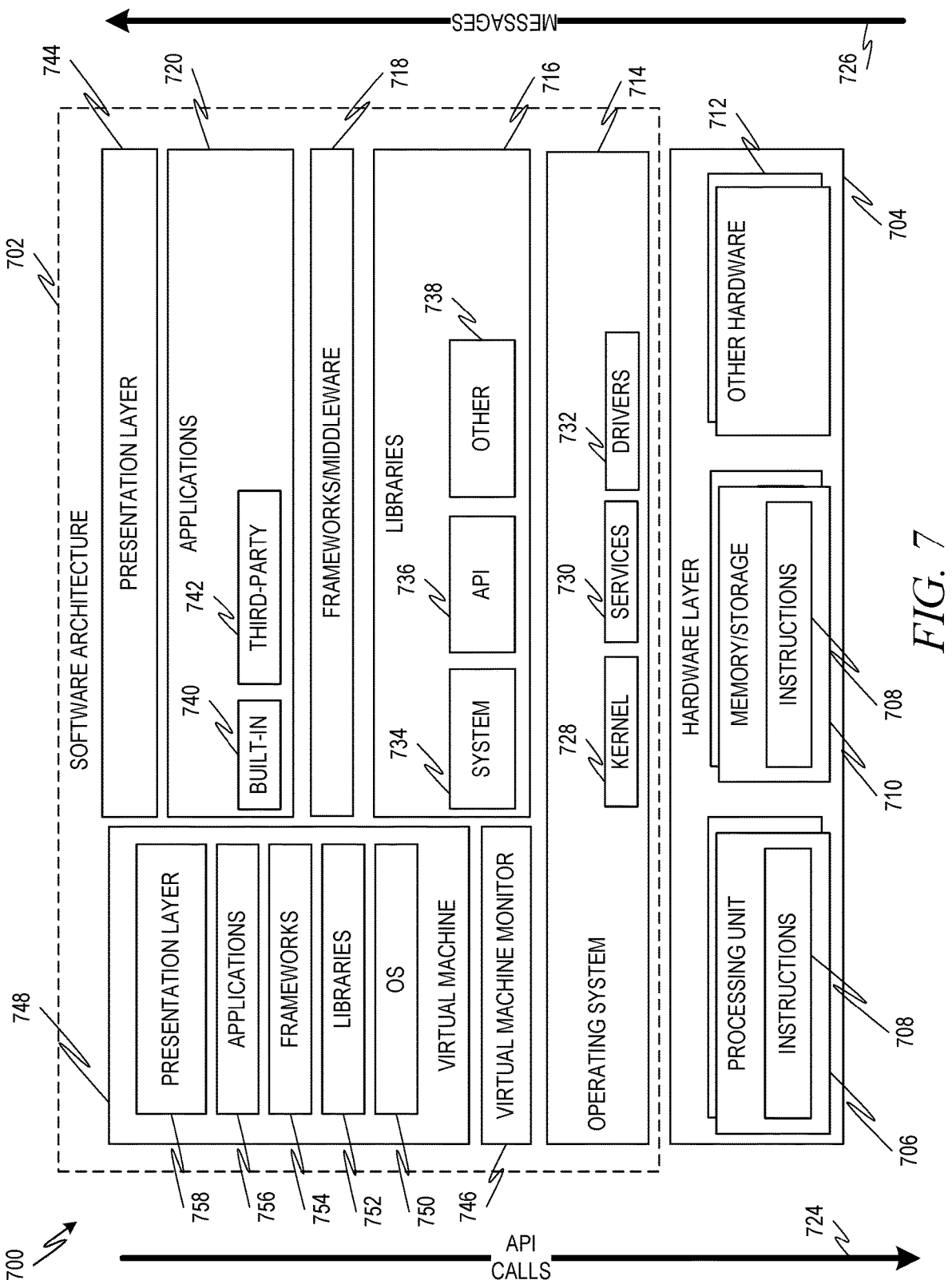
FIG. 7 is a block diagram showing one example of an architecture for a computing device.

FIG. 7 is a block diagram 700 showing one example of a software architecture 702 for a computing device. The architecture 702 may be used in conjunction with various hardware architectures, for example, as described herein. FIG. 7 is merely a non-limiting example of a software architecture and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712, which represents any other hardware of the hardware layer 704, such as the other hardware illustrated as part of the architecture 702.

In the example architecture of FIG. 7, the software architecture 702 may be conceptualized as a stack of layers where each layer provides particular functionality. For example, the software architecture 702 may include layers such as an operating system 714, libraries 716, middleware layer 718, applications 720, and presentation layer 744. Operationally, the applications 720 and/or other components within the layers may invoke API calls 724 through the software stack and access a response, returned values, and so forth illustrated as messages 726 in response to the API calls 724. The layers illustrated are representative in nature and not all software architectures have all layers. For example, some mobile or special purpose operating systems may not provide a middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The middleware layer 718 (also sometimes referred to as frameworks) may provide a higher-level common infrastructure that may be utilized by the applications 720 and/or other software components/modules. For example, the middleware layer 718 may provide various graphic user interface (GUI) functions, high-level resource management, high-level location services, and so forth. The middleware layer 718 may provide a broad spectrum of other APIs that may be utilized by the applications 720 and/or other software components/modules, some of which may be specific to a particular operating system or platform.

The applications 720 includes built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built-in operating system functions (e.g., kernel 728, services 730 and/or drivers 732), libraries (e.g., system 734, API libraries 736, and other libraries 738), and middleware layer 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine 748 as well as the interface with the host operating system (i.e., operating system 714). A software architecture executes within the virtual machine 748 such as an operating system 750, libraries 752, frameworks/middleware 754, applications 756 and/or presentation layer 758. These layers of software architecture executing within the virtual machine 748 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 8:
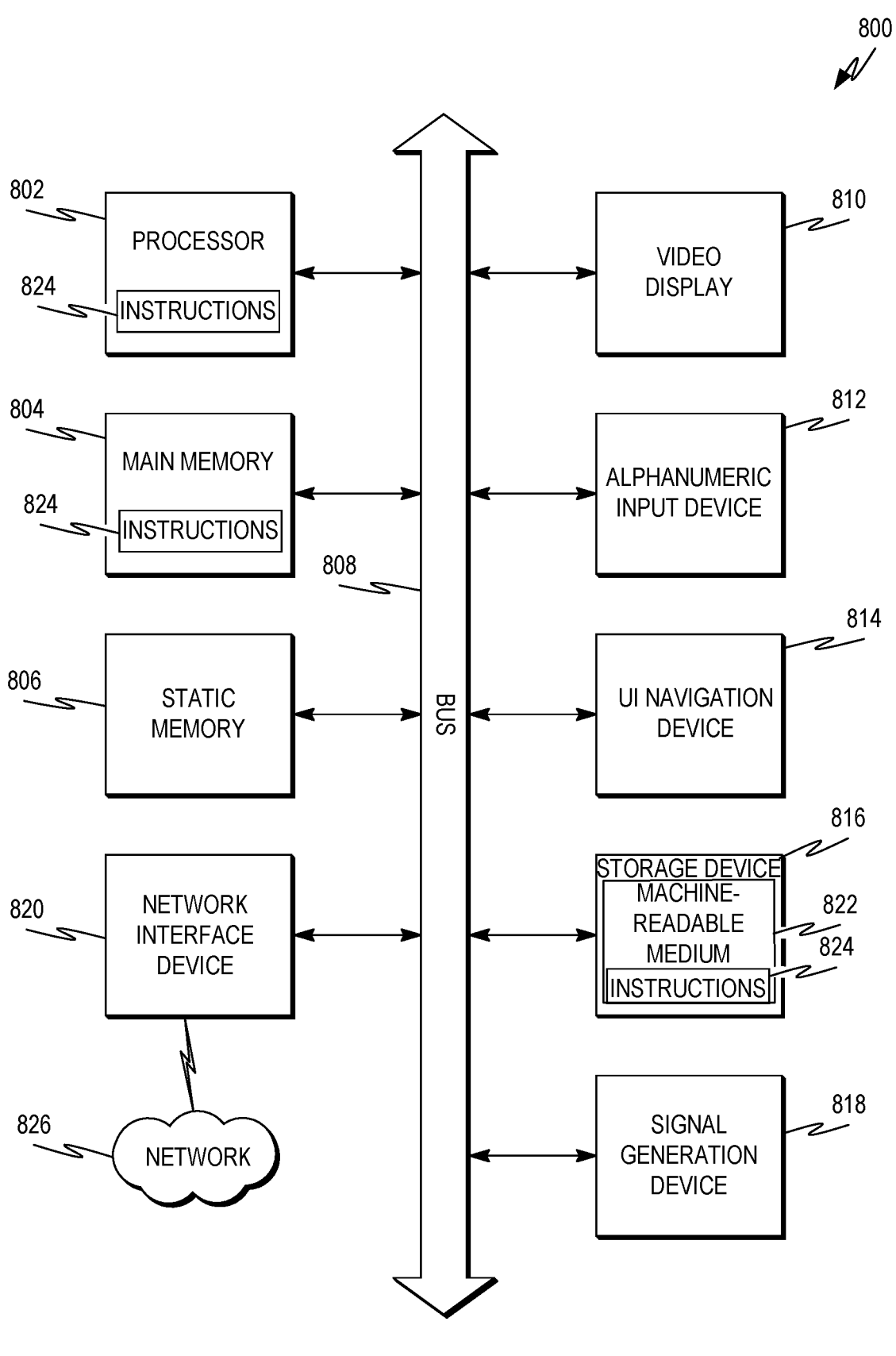
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices: magnetic disks such as internal hard disks and removable disks: magneto-optical disks: and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for managing multiple cloud-delivered services, the system comprising:

at least one processor programmed to perform operations comprising:

receiving, by an integration adapter executing at a data distribution computing system, event data from a first cloud-delivered service, the event data describing an event at the first cloud-delivered service;

sending, by the integration adapter and to a determination engine executing at the data distribution computing system, a request for data objects for responding to the event;

executing, by the determination engine, a trained computerized model;

providing, by the determination engine, to the trained computerized model, at least a portion of the event data;

determining, by the determination engine and based on the trained computerized model, a set of data objects responsive to the event at the first cloud-delivered service, the set of data objects comprising a first data object stored at a database management system in communication with the data distribution computing system and a second data object stored by a second cloud-delivered service different than the database management system;

determining, by the determination engine, a first target cloud-delivered service that is to receive the first data object in response to the event at the first cloud-delivered service and a second target cloud-delivered service that is to receive the second data object in response to the event at the first cloud-delivered service;

replicating, by the integration adapter, the first data object from the database management system to generate a first replicated data object;

replicating, by the integration adapter, the second data object from the second cloud-delivered service to generate a second replicated data object;

sending, by the integration adapter, the first replicated data object to the first target cloud-delivered service;

sending, by the integration adapter, the second replicated data object to the second target cloud-delivered service;

sending, by the integration adapter and to the first cloud-delivered service, a feedback request message;

receiving, by the integration adapter and from the first cloud-delivered service, feedback data, the feedback data describing a responsiveness of the first data object or the second data object to the event; and modifying the trained computerized model based at least in part on the feedback data.

2. The system of claim 1, the operations further comprising:

generating, by the integration adapter, training data for training the trained computerized model, the training data being based at least in part on the feedback data.

3. The system of claim 2, the operations further comprising re-training the trained computerized model using the training data.

4. The system of claim 1, the determining of at least one of the first data object or the second data object being based at least in part on rule data describing data objects responsive to the event, the operations further comprising generating, by the integration adapter, updated rule data based at least in part on the feedback data.

5. The system of claim 1, the feedback data describing a third data item responsive to the event.

6. The system of claim 1, the determining of at least one of the first data object or the second data object being based at least in part on rule data describing data objects responsive to the event and at least in part on an output of a trained computerized model.

7. A method for managing multiple cloud-delivered services, the method comprising:

receiving, by an integration adapter executing at a data distribution computing system, event data from a first cloud-delivered service, the event data describing an event at the first cloud-delivered service;

sending, by the integration adapter and to a determination engine executing at the data distribution computing system, a request for data objects for responding to the event;

executing, by the determination engine, a trained computerized model;

providing, by the determination engine, to the trained computerized model, at least a portion of the event data;

determining, by the determination engine and based on the trained computerized model, a set of data objects responsive to the event at the first cloud-delivered service, the set of data objects comprising a first data object stored at a database management system in communication with the data distribution computing system and a second data object stored by a second cloud-delivered service different than the database management system;

determining, by the determination engine, a first target cloud-delivered service that is to receive the first data object in response to the event at the first cloud-delivered service and a second target cloud-delivered service that is to receive the second data object in response to the event at the first cloud-delivered service;

replicating, by the integration adapter, the first data object from the database management system to generate a first replicated data object;

replicating, by the integration adapter, the second data object from the second cloud-delivered service to generate a second replicated data object;

sending, by the integration adapter, the first replicated data object to the first target cloud-delivered service;

sending, by the integration adapter, the second replicated data object to the second target cloud-delivered service;

sending, by the integration adapter and to the first cloud-delivered service, a feedback request message;

receiving, by the integration adapter and from the first cloud-delivered service, feedback data, the feedback data describing a responsiveness of the first data object or the second data object to the event; and modifying the trained computerized model based at least in part on the feedback data.

8. The method of claim 7, further comprising:

generating, by the integration adapter, training data for training the trained computerized model, the training data being based at least in part on the feedback data.

9. The method of claim 8, further comprising re-training the trained computerized model using the training data.

10. The method of claim 7, the determining of at least one of the first data object or the second data object being based at least in part on rule data describing data objects responsive to the event, the method further comprising generating, by the integration adapter, updated rule data based at least in part on the feedback data.

11. The method of claim 7, the feedback data describing a third data item responsive to the event.

12. The method of claim 11, the determining of at least one of the first data object or the second data object being based at least in part on rule data describing data objects responsive to the event and at least in part on an output of the trained computerized model.

13. A non-transitory machine-readable medium comprising instructions thereon that, when executed by at least one processor, causes the at least one processor to perform operations comprising:

receiving, by an integration adapter executing at a data distribution computing system, event data from a first cloud-delivered service, the event data describing an event at the first cloud-delivered service;

sending, by the integration adapter and to a determination engine executing at the data distribution computing system, a request for data objects for responding to the event;

executing, by the determination engine, a trained computerized model;

providing, by the determination engine, to the trained computerized model, at least a portion of the event data;

determining, by the determination engine and based on the trained computerized model, a set of data objects responsive to the event at the first cloud-delivered service, the set of data objects comprising a first data object stored by a database management system in communication with the data distribution computing system and a second data object stored by a second cloud-delivered service different than the database management system;

determining, by the determination engine, a first target cloud-delivered service that is to receive the first data object in response to the event at the first cloud-delivered service and a second target cloud-delivered service that is to receive the second data object in response to the event at the first cloud-delivered service;

replicating, by the integration adapter, the first data object from the database management system to generate a first replicated data object;

replicating, by the integration adapter, the second data object from the second cloud-delivered service to generate a second replicated data object;

sending, by the integration adapter, the first replicated data object to the first target cloud-delivered service;

sending, by the integration adapter, the second replicated data object to the second target cloud-delivered service;

sending, by the integration adapter and to the first cloud-delivered service, a feedback request message;

receiving, by the integration adapter and from the first cloud-delivered service, feedback data, the feedback data describing a responsiveness of the first data object or the second data object to the event; and modifying the trained computerized model based at least in part on the feedback data.

14. The non-transitory machine-readable medium of claim 13, the operations further comprising:

generating, by the integration adapter, training data for training the trained computerized model, the training data being based at least in part on the feedback data.

15. The non-transitory machine-readable medium of claim 14, the operations further comprising re-training the trained computerized model using the training data.

16. The non-transitory machine-readable medium of claim 13, the determining of at least one of the first data object or the second data object being based at least in part on rule data describing data objects responsive to the event, the operations further comprising generating, by the integration adapter, updated rule data based at least in part on the feedback data.

17. The non-transitory machine-readable medium of claim 13, the feedback data describing a third data item responsive to the event.

18. The non-transitory machine-readable medium of claim 13, the determining of at least one of the first data object or the second data object being based at least in part on rule data describing data objects responsive to the event and at least in part on an output of a trained computerized model.

* * * * *